(12) United States Patent
Shimizu (10) Patent No.: US 11,535,125 B2
(45) Date of Patent: Dec. 27, 2022

(54) MANUFACTURING METHOD OF LOWER RAIL OF SEAT SLIDER DEVICE

(71) Applicant: TOYOTA BODY SEIKO CO., LTD., Takahama (JP)

(72) Inventor: Norio Shimizu, Takahama (JP)

(73) Assignee: TOYOTA BODY SEIKO CO., LTD., Takahama (JP)

( * ) Notice: Subject to any disclaimer, the term of this patent is extended or adjusted under 35 U.S.C. 154(b) by 23 days.

(21) Appl. No.: 16/450,119

(22) Filed: Jun. 24, 2019

(65) Prior Publication Data

US 2020/0001745 A1 Jan. 2, 2020

(30) Foreign Application Priority Data

Jun. 29, 2018 (JP) .............................. JP2018-124195

(51) Int. Cl.
*B60N 2/08* (2006.01)
*B60N 2/07* (2006.01)
(Continued)

(52) U.S. Cl.
CPC ........... *B60N 2/0806* (2013.01); *B21D 28/32* (2013.01); *B21D 53/88* (2013.01); *B60N 2/075* (2013.01);
(Continued)

(58) Field of Classification Search
CPC .... B60N 2/0806; B60N 2/075; B60N 2/0843; B60N 2/0715; B60N 2/0875; B21D 28/32; B21D 53/88; B21D 28/26
See application file for complete search history.

(56) References Cited

U.S. PATENT DOCUMENTS 8,925,888 B2 * 1/2015 Domoto ............... B60N 2/0705
248/429
9,045,060 B2 * 6/2015 Zaiki .................... B60N 2/0705
(Continued)

FOREIGN PATENT DOCUMENTS

CN 101284499 A 10/2008
CN 102673433 A 9/2012
(Continued)

OTHER PUBLICATIONS

Feb. 8, 2022 Office Action issued in Japanese Application No. 2018-124195.
(Continued)

*Primary Examiner* — Tan Le
(74) *Attorney, Agent, or Firm* — Oliff PLC (57) ABSTRACT

A seat slider device may include a lower rail attachable to a body of a vehicle; and an upper rail attachable to a lower portion of a seat and slidably engaging with the lower rail. The upper rail may include a lock pin movable along a short direction of the upper rail. The lower rail may include a plurality of first holes and a second hole. The first holes may be arranged along a longitudinal direction of the lower rail and configured to engage with the lock pin, and the second hole may be arranged with the first holes along the longitudinal direction of the lower rail. The second hole may be positioned at a position where the lock pin is incapable of engaging with the second hole or the second hole may have a size with which the lock pin is incapable of engaging.

3 Claims, 9 Drawing Sheets

(51) Int. Cl.
*F16M 13/00* (2006.01)
*B21D 28/26* (2006.01)
*B21D 28/32* (2006.01)
*B21D 53/88* (2006.01)
*B60N 2/075* (2006.01)

(52) U.S. Cl.
CPC ............ *B60N 2/0843* (2013.01); *B21D 28/26* (2013.01); *B60N 2/0715* (2013.01); *B60N 2/0818* (2013.01); *B60N 2/0825* (2013.01)

(56) References Cited

U.S. PATENT DOCUMENTS

| | | | |
|---|---|---|---|
| 9,061,604 B2 * | 6/2015 | Kume | B60N 2/0715 |
| 9,533,604 B2 * | 1/2017 | Nakashima | B60N 2/0818 |
| 2007/0176072 A1 * | 8/2007 | Ikegaya | B60N 2/0818 |
| | | | 248/429 |
| 2015/0001366 A1 | 1/2015 | Nakashima et al. | |
| 2015/0258916 A1 * | 9/2015 | Kim | B60N 2/0705 |
| | | | 248/429 |

FOREIGN PATENT DOCUMENTS

| | | |
|---|---|---|
| JP | 2005-119613 A | 5/2005 |
| JP | 2007-196870 A | 8/2007 |
| JP | 2013-189184 A | 9/2013 |
| JP | 2017-202736 A | 11/2017 |

OTHER PUBLICATIONS

Jul. 1, 2022 Office Action issued in Chinese Application No. 201910576023.X.

* cited by examiner

MANUFACTURING METHOD OF LOWER RAIL OF SEAT SLIDER DEVICE

CROSS-REFERENCE

This application claims priority to Japanese Patent Application No. 2018-124195 filed on Jun. 29, 2018, the contents of which are hereby incorporated by reference into the present application.

TECHNICAL FIELD

The teaching disclosed herein relates to a seat slider device which slides a seat of a vehicle and a manufacturing method thereof.

BACKGROUND

A seat slider device which slides a seat is provided with a lower rail attachable to a body of a vehicle and an upper rail attachable to a lower portion of the seat. The upper rail slidably engages with the lower rail.

The seat slider device is provided with a lock mechanism which locks the upper rail with respect to the lower rail. A general lock mechanism is constituted of a plurality of holes provided in the lower rail and a lock pin provided on the upper rail. Japanese Patent Application Publication No. 2017-202736 describes an example of such a seat slider device. The lock pin swings to be inserted to and pulled out from the holes. The upper rail is fixed to the lower rail when the lock pin engages with one of the plurality of holes. The upper rail becomes slidable with respect to the lower rail when the lock pin retracts and the engagement thereof is released.

SUMMARY

A plurality of holes to engage with a lock pin is often arranged in a part of a lower rail in a longitudinal direction thereof. Thus, rigidity of the lower rail may differ between its portion where the holes are provided and the other portion where no holes are provided. The lower rail is fabricated by bending a plate. Due to this, if the rigidity differs between the portions of the rail in the longitudinal direction, a springback difference is generated therebetween, as a result of which a slight shape difference may be generated between the portions with different rigidities. The disclosure herein provides a seat slider device with a lower rail which may hardly cause a shape difference in a longitudinal direction of the lower rail and a manufacturing method thereof.

A seat slider device disclosed herein may comprise a lower rail attachable to a body of a vehicle and an upper rail attachable to a lower portion of a seat. The upper rail may slidably engage with the lower rail. The upper rail may comprise a lock pin movable along a short direction of the upper rail. The lower rail may comprise a plurality of first holes and a second hole. The plurality of first holes may be arranged along a longitudinal direction of the lower rail. The first holes are configured to engage with the lock pin. The second hole may be arranged with the first holes along the longitudinal direction of the lower rail. The second hole may be positioned at a position where the lock pin is incapable of engaging therewith. Alternatively, the second hole may have a size with which the lock pin is incapable of engaging. This seat slider device comprises a row of the holes over an entirety of the lower rail in the longitudinal direction, thus variations in rigidity in the longitudinal direction are small.

Due to this, a springback difference upon processing is small, and a shape difference of the lower rail is small in the longitudinal direction. Since the second hole is positioned at the position where the lock pin is incapable of engaging therewith or has the size with which the lock pin is incapable of engaging, the lock pin is suppressed from engaging with the second hole by mistake.

In some cases, the upper rail may comprise a plurality of lock pins arranged at a first pitch along a longitudinal direction of the upper rail. In such cases, the lower rail may comprise the plurality of first holes arranged at the first pitch and a plurality of second holes arranged at a second pitch different from the first pitch. Alternatively, the second hole may be arranged at a height different from a height at which the first holes are arranged. In either case as above, the lock pins/lock pin are/is incapable of engaging with the second holes/second hole.

A typical lower rail is provided with the plurality of first holes in a middle portion of the lower rail in the longitudinal direction of the lower rail. In this case, at least one of the second holes may be arranged at each end portion of the lower rail in its longitudinal direction. The disclosure herein provides a suitable method of manufacturing such a seat slider device. The manufacturing method may comprise: forming the plurality of first holes in a middle portion of a plate for the lower rail and the plurality of second holes; and bending the plate into a shape of the lower rail. By providing a row of the holes over an entire length of the plate for the lower rail, a degree of springback in the middle portion and a degree of springback in the end portions of the plate may become substantially same. Due to this, a shape difference between the middle portion and the end portions of the lower rail may be small.

Details and further improvements of the art disclosed herein will be described in the following DETAILED DESCRIPTION

DETAILED DESCRIPTION

Figure 1:
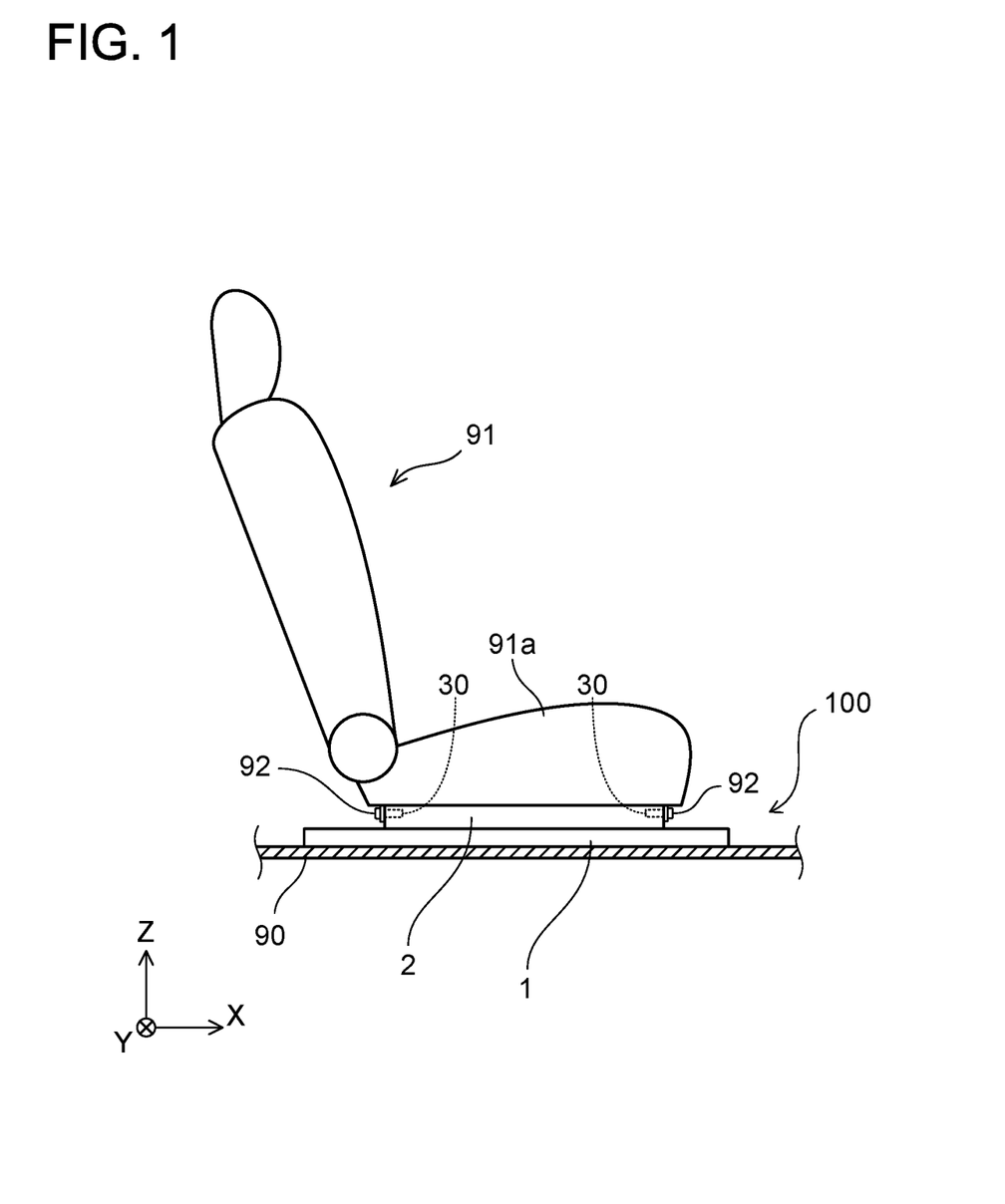
FIG. 1 is a side view of a seat slider structure according to an embodiment.

A seat slider device 100 according to an embodiment will be described with reference to the drawings. FIG. 1 shows a side view of the seat slider device 100 attached to a vehicle. The seat slider device 100 includes a lower rail 1 and an upper rail 2. The upper rail 2 is slidably attached to the lower rail 1. The lower rail 1 is fixed to a floor panel 90 of the vehicle. The upper rail 2 is attached to a lower portion of a seat cushion 91a of a seat 91. A screw hole 30 is provided at each of front and rear ends of the upper rail 2, and the seat cushion 91a is fixed to the upper rail 2 by bolts 92.

Figure 2:
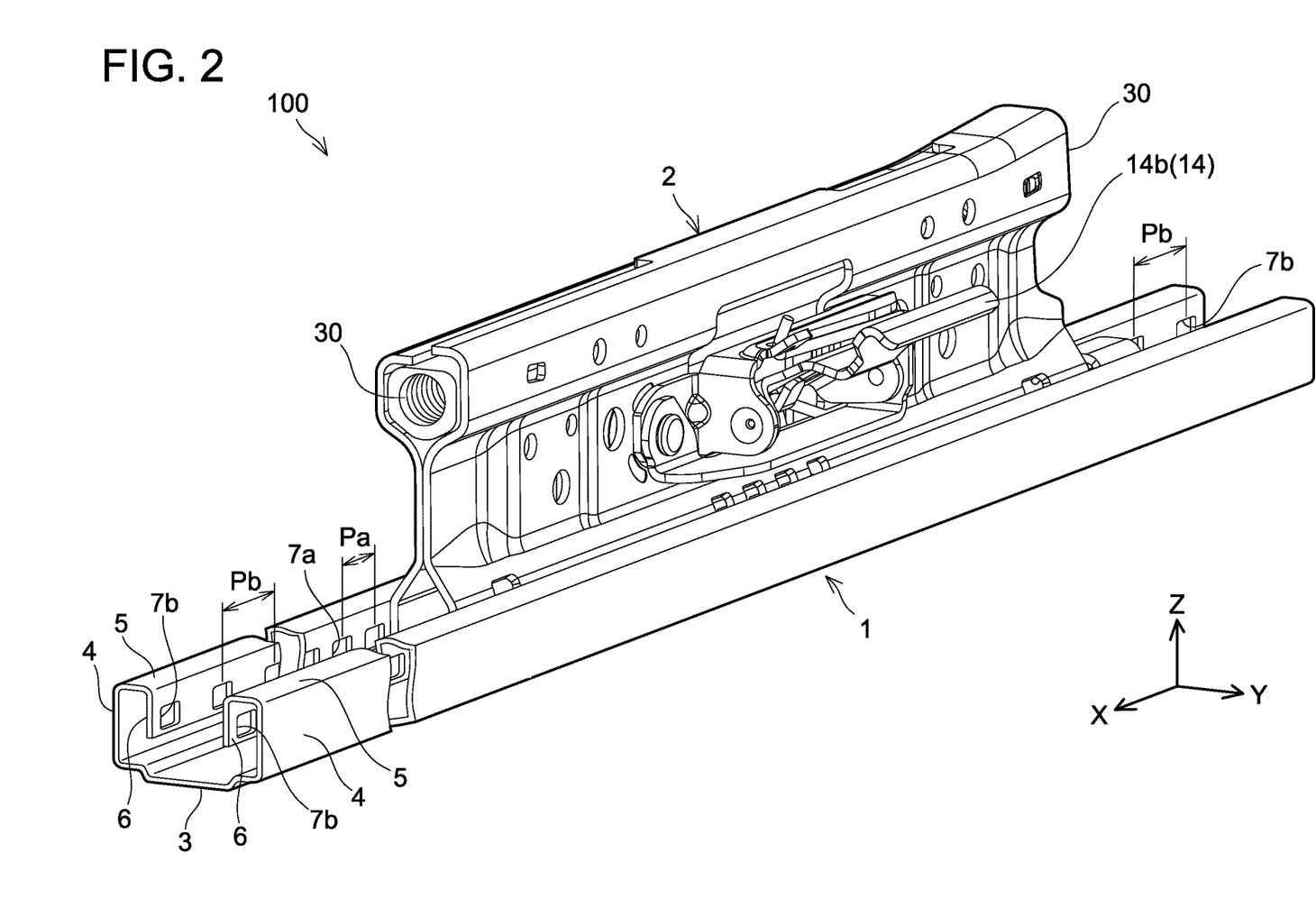
FIG. 2 is a perspective view of a seat slider device.
Figure 3:
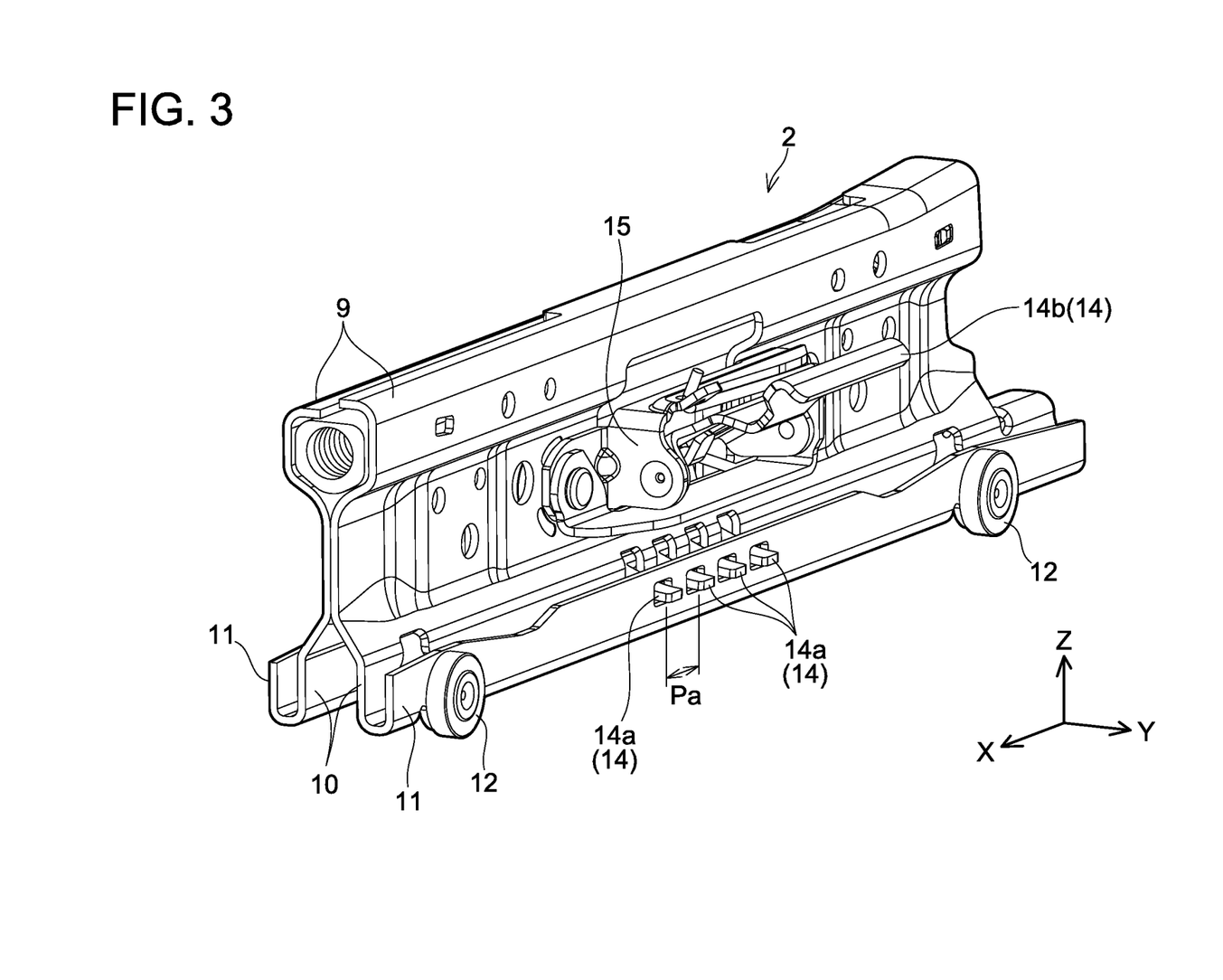
FIG. 3 is a perspective view of an upper rail.

FIG. 2 shows a perspective view of the seat slider device 100 and FIG. 3 shows a perspective view of the upper rail 2. An X axis in a coordinate system of the drawings corresponds to a rail longitudinal direction of the rails, and a Y axis corresponds to a rail short direction of the rails. A positive direction of a Z axis corresponds to an upward direction. The directions of the axes in the coordinate system are same in all the drawings to be mentioned hereinbelow.

The lower rail 1 is fabricated from one piece of metal plate by bending process (roll forming process). The lower rail 1 includes a bottom plate portion 3 attached to a body of the vehicle, a pair of outer vertical plate portions 4, a pair of upper plate portions 5, and a pair of inner vertical plate portions 6. The pair of outer vertical plate portions 4 respectively extends upward from both ends of the bottom plate portion 3 in the rail short direction. The pair of upper plate portions 5 extends laterally from upper ends of their corresponding outer vertical plate portions 4 toward a center in the rail short direction. The pair of inner vertical plate portions 6 extends downward from inner ends of their corresponding upper plate portions 5. The inner vertical plate portions 6 face each other. The outer vertical plate portions 4 and the inner vertical plate portions 6 are substantially parallel to each other. The pair of inner vertical plate portions 6 includes a plurality of first holes 7a and a plurality of second holes 7b arranged along the rail longitudinal direction. The plurality of first holes 7a is arranged at a first pitch Pa, and the plurality of second holes 7b is arranged at a second pitch Pb. The plurality of first holes 7a and the plurality of second holes 7b are provided in each of the inner vertical plate portions 6.

A plurality of lock pins 14a arranged along the rail longitudinal direction is provided at a middle portion of the upper rail 2 in the rail longitudinal direction (see FIG. 3). The plurality of lock pins 14a is arranged at the first pitch Pa. The plurality of the lock pins 14a is a part of a lock member 14. The lock pins 14a are configured to swing to be inserted to and pulled out from the first holes 7a. In other words, the lock pins 14a are movable in the rail short direction (Y direction in the drawings).

Figure 4A:
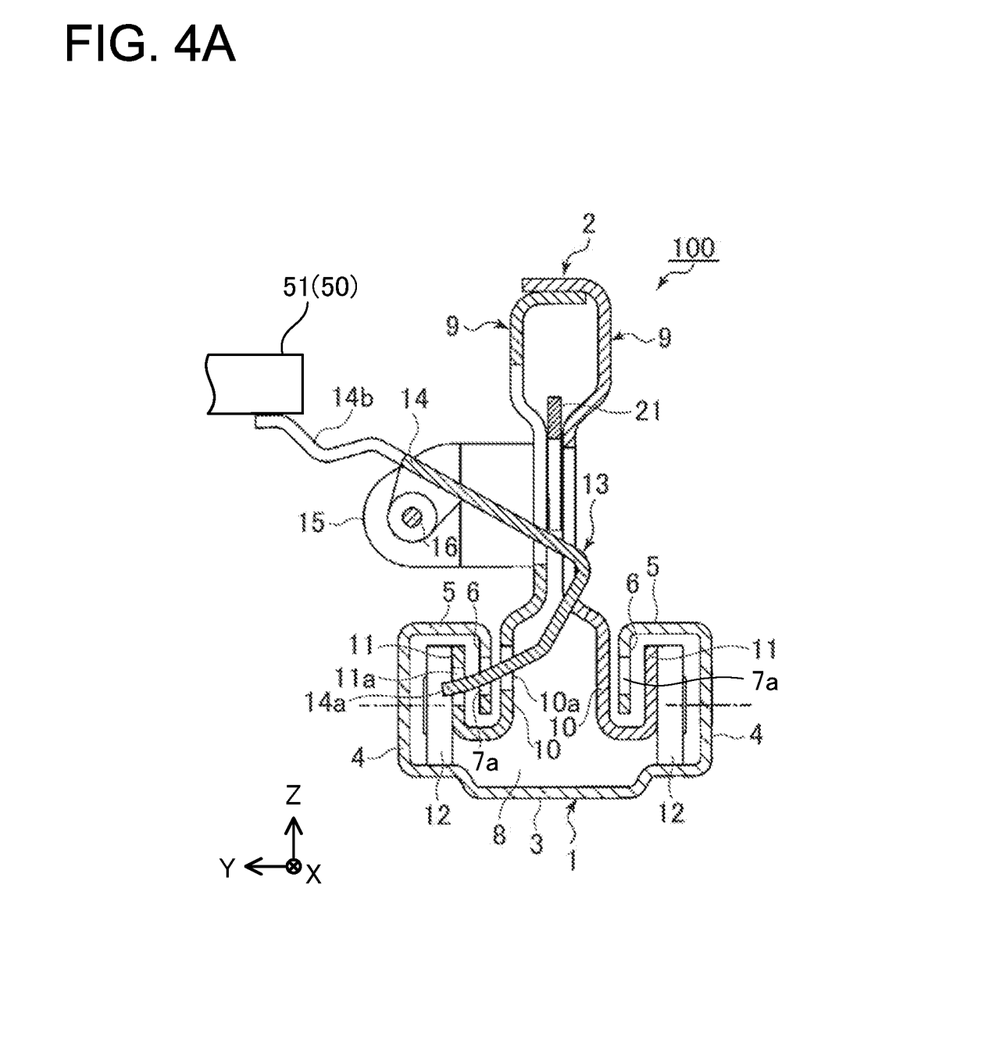
FIG. 4A is a cross-sectional view of the seat slider device cut along a YZ plane passing through a lock member (locked).
Figure 4B:
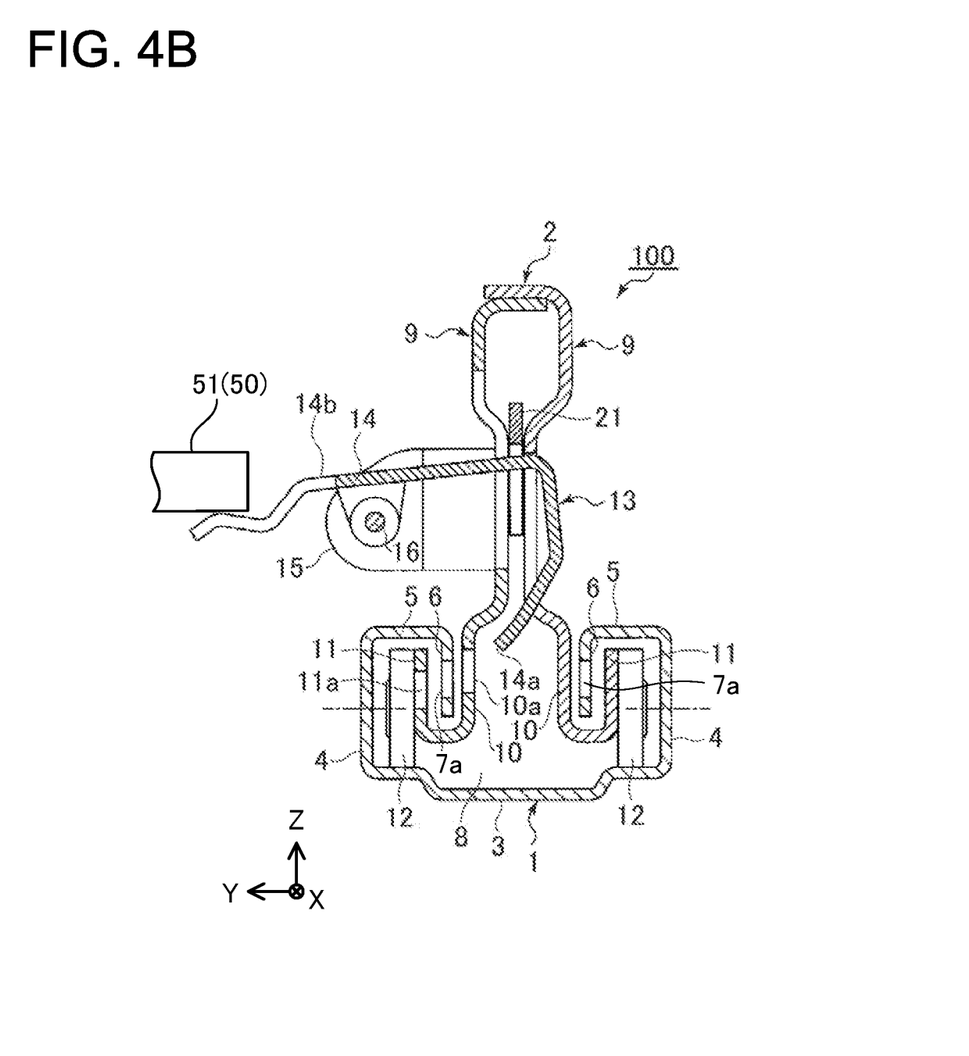
FIG. 4B is a cross-sectional view of the seat slider device cut along a YZ plane passing through a lock member (unlocked).

A swing mechanism of the lock pins 14a will be described with reference to FIGS. 4A and 4B. FIGS. 4A and 4B each show a cross section of the seat slider device 100 cut along a YZ plane passing through the lock member 14. FIG. 4A is a diagram showing a locked state to be described later. FIG. 4B is a diagram showing an unlocked state.

In a space defined inside the lower rail 1, a space surrounded by the bottom plate portion 3, the outer vertical plate portions 4, the upper plate portions 5, and the inner vertical plate portions 6 constitutes an accommodation space 8 for the upper rail 2. The accommodation space 8 is open upward between the pair of inner vertical plate portions 6. A part of the upper rail 2, that is, a lower-side portion thereof, is accommodated in the accommodation space 8. A remaining portion of the upper rail 2, that is, an upper-side portion thereof, protrudes upward from a portion of the lower rail 1 that is open upward.

The upper rail 2 includes a pair of metal plates 9 overlapped with each other. Each of the metal plates 9 include a pair of side plate portions 10 and an arm plate portions 11. The pair of side plate portions 10 is arranged inside the accommodation space 8, and each of the side plate portions 10 faces its corresponding inner vertical plate portion 6 of the lower rail 1. The pair of arm plate portions 11 each bends from its corresponding side plate portion 10 and extends between its corresponding outer vertical plate portion 4 and inner vertical plate portion 6. The arm plate portions 11 are substantially parallel to the outer vertical plate portions 4 and the inner vertical plate portions 6. Each of the arm plate portions 11 is a portion that had been formed to bend from a lower side of the corresponding side plate portion 10 and extend vertically upward.

Of the pair of side plate portions 10, the side plate portion 10 arranged on a +Y direction side has a plurality of rectangular openings 10a provided therein. Similarly, of the pair of arm plate portions 11, the arm plate portion 11 arranged on the +Y direction side has a plurality of rectangular openings 11a provided therein. Pitches of the openings 10a, 1 a are equal to the pitch of the first holes 7a (the first pitch Pa) described above (see FIG. 3).

Rollers 12 are rotatably supported on the arm plate portions 11. The rollers 12 contact an upper surface of the bottom plate portion 3 of the lower rail 1, and support the upper rail 2 such that the upper rail 2 can slide in the rail longitudinal direction (that is, an X axis direction).

The seat slider device 100 is provided with a slide lock mechanism 13. The slide lock mechanism 13 is configured to switch between the locked state (FIG. 4A) in which movement of the upper rail 2 along the rail longitudinal direction (the X axis direction) is restricted and the unlocked state (FIG. 4B) in which the movement of the upper rail 2 along the rail longitudinal direction (the X axis direction) is allowed. The slide lock mechanism 13 includes the lock member 14. The lock member 14 is constituted of bent metal plate. The lock member 14 is attached to one of the pair of metal plates 9 that is arranged on the +Y direction side via a bracket 15. The bracket 15 rotatably supports the lock member 14 by a rotational shaft 16 parallel to the X axis.

The lock member 14 includes the lock pins 14a and an operation portion 14b. The plurality of lock pins 14a is provided at an end portion of the lock member 14. The lock pins 14a each have a rectangular strip shape, and are arranged to align in a row along the X axis. A width of each lock pin 14a (a dimension thereof in the X direction) is set to a width that can be inserted to all of the openings 10a, the openings 11a, and the first holes 7a of the lower rail 1. Further, as described above, the pitch of the plurality of lock pins 14a (interval with which the plurality of lock pins 14a is arranged) is equal to the first pitch Pa which is an interval with which the plurality of first holes 7a is arranged. As shown in FIG. 4A, the locked state is a state in which each of the lock pins 14a is penetrating its corresponding opening 10a, opening 11a, and first hole 7a. Sliding of the upper rail 2 relative to the lower rail 1 (that is, the movement thereof along the rail longitudinal direction) is restricted by the lock pins 14a being inserted into the first holes 7a (the locked state).

The operation portion 14b is a portion that is provided at an end portion of the lock member 14 on an opposite side from the lock pins 14a with respect to the rotational shaft 16. A push-down pin 51 of a slider unlock lever 50, which moves in conjunction with a movement of a handle (not shown) manipulated by a user, is engaged with the operation portion 14b. FIGS. 4A and 4B show only a distal end of the push-down pin 51. When the user pulls up the handle in the locked state of FIG. 4A, the push-down pin 51 moves downward, which pushes the operation portion 14b down. The lock member 14 rotates about the rotational shaft 16, and the lock pins 14a swing in a direction of being pulled out from the openings 10a, the openings 11a and the first holes 7a. That is, the lock member 14 shifts to the unlocked state of FIG. 4B. In the unlocked state, the restriction on sliding of the upper rail 2 relative to the lower rail 1 is released, and the upper rail 2 can therefore move along the rail longitudinal direction (the X axis direction) (the unlocked state).

When the user pulls down the handle, which is not shown, in the unlocked state, the lock pins 14a swing again to penetrate through the openings 10a, the openings 11a and the first holes 7a. Then, the lock member 14 returns to the locked state (FIG. 4A). That is, the lock pins 14a are inserted to or pulled out from the openings 10a, the openings 11a and the first holes 7a in accordance with the handle manipulation by the user. The lock pins 14a swing to be inserted to and pulled out from the openings 10a, the openings 11a and the first holes 7a.

Figure 5:
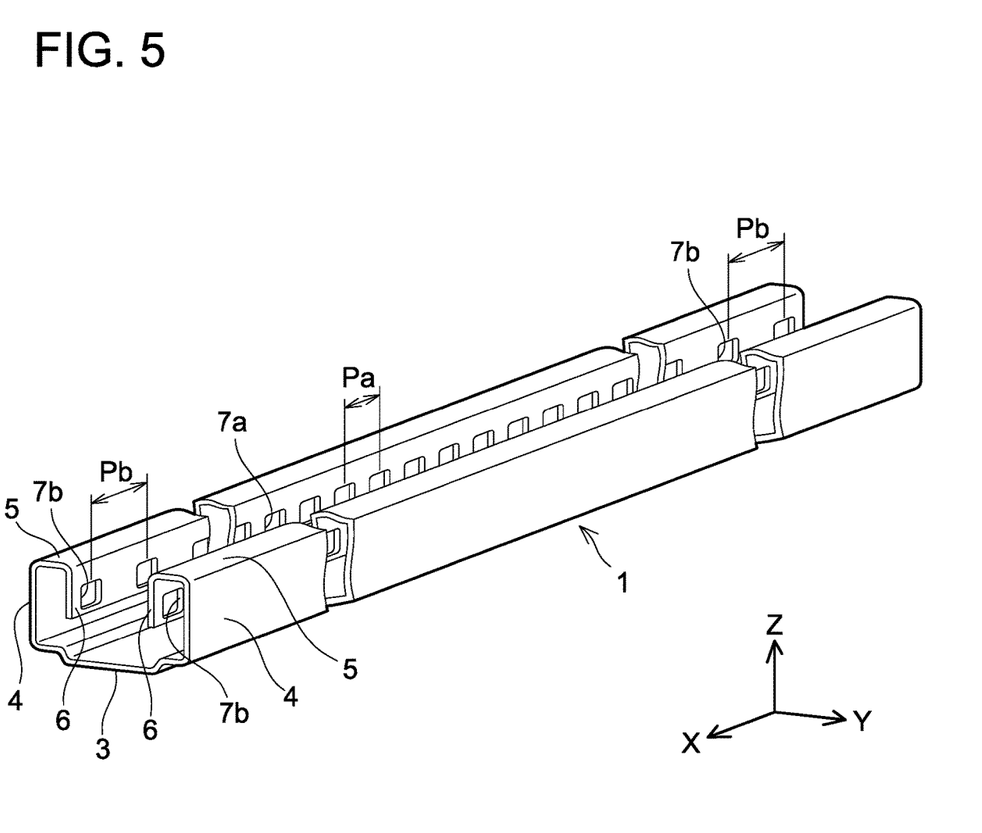
FIG. 5 is a perspective view of a lower rail.

FIG. 5 shows a perspective view of the lower rail 1. As described above, the plurality of first holes 7a arranged at the first pitch Pa and the plurality of second holes 7b arranged at the second pitch Pb are provided in each of the pair of inner vertical plate portions 6 of the lower rail 1. The plurality of lock pins 14a of the slide lock mechanism 13 is arranged at the first pitch Pa. The lock pins 14a can be inserted (fitted) to the first holes 7a, however, they cannot be inserted (fitted) to the second holes 7b since the pitches are different therebetween. Although hidden and invisible in FIG. 5, the first holes 7a and the second holes 7b are provided also in the inner vertical plate portion 6 on a+Y side in the coordinate system of FIG. 5.

As shown in FIG. 5, the plurality of second holes 7b is provided at each of end portions of each inner vertical plate portion 6 of the lower rail 1 in the rail longitudinal direction. The plurality of first holes 7a is provided at a middle portion of each inner vertical plate portion 6 in the rail longitudinal direction. In other words, in each inner vertical plate portion 6, the plurality of first holes 7a is provided so as to be interposed between the second holes 7b at the end portions of the inner vertical plate portion 6. The plurality of first holes 7a is provided to engage with the lock pins 14a of the upper rail 2. The plurality of second holes 7b has the following advantage. The lower rail 1 is manufactured from one piece of plate by bending process (roll forming process). If the plurality of second holes 7b is not provided, a degree of springback differs between the middle portions where the plurality of first holes 7a is provided and the end portions where no holes are provided, after the plate has been bent. This is because a stress difference is generated in the plate during the bending process due to a difference in rigidity generated by the presence and absence of holes. As a result, a cross sectional shape of the lower rail 1 along the rail short direction differs between a middle portion and end portions of the lower rail 1. By providing the plurality of second holes 7b in the end portions of the lower rail 1, the difference in degree of springback between the end portions and the middle portion of the lower rail 1 becomes small. As a result, the shape difference between the end portions and the middle portion becomes small.

The difference in springback between the middle portion and the end portions is caused also by a jig for positioning portions of the plate that correspond to the end portions of the lower rail 1 with respect to a bending machine. The jig is pressed against end portions of the plate in a short direction thereof (the short direction of the lower rail) within designated portions of the plate (the portions corresponding to the end portions of the lower rail 1 in the rail longitudinal direction). Due to this, stress is generated in the short direction of the plate at the designated portions. As a result, stress generated at the end portions becomes larger than stress generated in a portion of the plate that corresponds to the middle portion of the lower rail 1. Due to this, the springback is greater at the designated portions corresponding to the end portions of the lower rail 1 than at the middle portion. The plurality of second holes 7b alleviates the stress in the short direction at the portions corresponding to the end portions of the lower rail 1. The plurality of second holes 7b alleviates the springback at the end portions of the lower rail 1 caused by the difference in stress.

A method of manufacturing the lower rail 1 (a method of manufacturing a seat slider device) will be described with reference to FIGS. 6A to 6C. Firstly, the plurality of first holes 7a arranged at the first pitch Pa in the rail longitudinal direction and the plurality of second holes 7b arranged at the second pitch Pb in the rail longitudinal direction are formed in a flat plate 60a for a lower rail (hole forming step, see FIG. 6A). The second holes 7b are provided in each of portions of the plate corresponding to the end portions of the lower rail 1 in the rail longitudinal direction, and the first holes 7a are provided in a portion of the plate corresponding to the middle portion of the lower rail 1 in the rail longitudinal direction. In other words, the first holes 7a and the second holes 7b are arranged in a row between each pair of an edge of the plate 60a in the short direction and an outermost bending line in the short direction (broken line DL in FIG. 6A). The second pitch Pb is different from the first pitch Pa.

Next, the plate 60a is subjected to a bending process to bend it into a shape of lower rail (bending step). The bending process is, more specifically, a processing method called roll forming, in which the flat plate 60a is gradually deformed into the shape of the lower rail 1 by a plurality of pairs of rollers. Each pair of rollers is arranged with the roller circumferential surfaces facing each other. The plate 60a passes between the pairs of rollers. The respective pairs of rollers are inclined at suitable angles, and the plate 60a is slightly deformed when passing through each pair of rollers. For example, the flat plate 60a shown in FIG. 6A is slightly bent as in a plate 60b in FIG. 6B when it passes through a first pair of rollers. When the plate 60b in FIG. 6B passes through a second pair of rollers, it is further bent slightly as in a plate 60c in FIG. 6C. When the plate 60c in FIG. 6C passes through a third pair of rollers, it is bent to the shape of the lower rail 1, which is a completed product, as shown in FIG. 5. In FIGS. 6B and 6C, curves at the bottom plate portion 3 are omitted. In the actual bending process, a flat plate is gradually bent to the shape of the lower rail by using approximately 30 pairs of rollers.

The second holes 7b are provided in portions of the plates 60a to 60c corresponding to the end portions of the lower rail. The second holes 7b alleviate the stress generated at the portions corresponding to the end portions of the lower rail during the bending process. As a result, the seat slider device 100 having a small shape difference between the middle portion and the end portions of the lower rail is obtained.

Figure 6A:
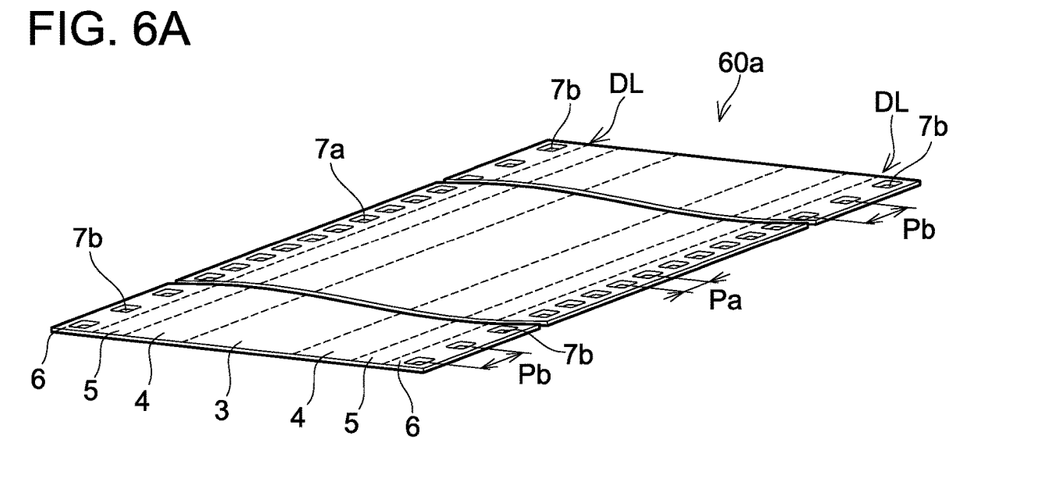
FIG. 6A is a diagram explaining a method of manufacturing the lower rail.
Figure 6B:
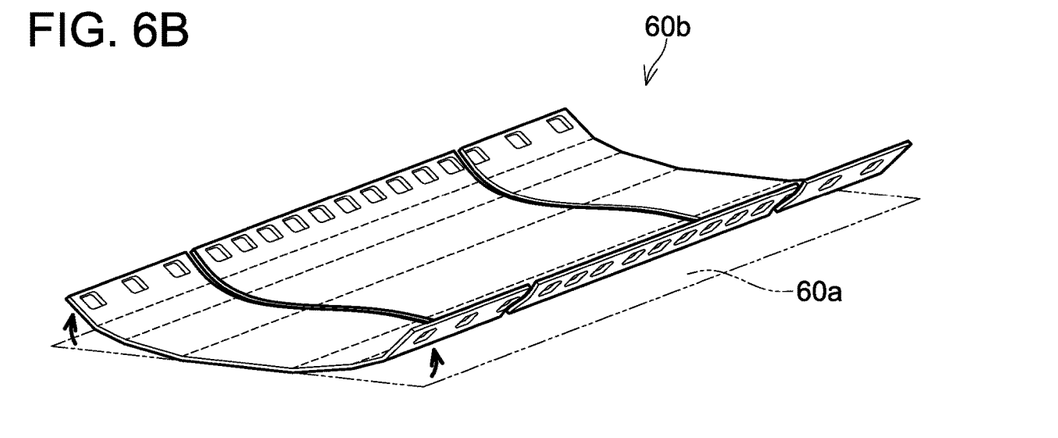
FIG. 6B is another diagram explaining a method of manufacturing the lower rail.
Figure 6C:
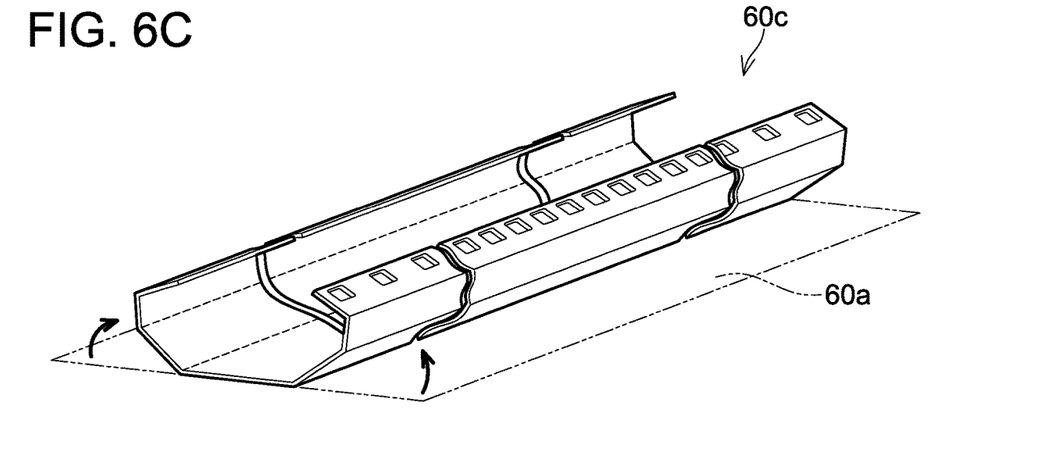
FIG. 6C is yet another diagram explaining a method of manufacturing the lower rail.

The one piece of plate 60a shown in FIG. 6A has a total length which is equal to a length of the lower rail 1 in the longitudinal direction. In some cases, a plate for manufacturing the lower rail 1 may have a length which is at least twice the total length of the lower rail 1. That is, there may be a case where one piece of plate that has been subjected to the bending process is cut to a length corresponding to a length of the lower rail to obtain a plurality of the lower rails. In this case, in the hole forming step, a row of the first holes 7a and a row of the second holes 7b are formed alternately in a longitudinal direction of the plate. After the bending step, the plate is cut to the length of the lower rail 1 such that the second holes 7b are positioned on both sides of each row of the first holes 7a (cutting step).

Figure 7:
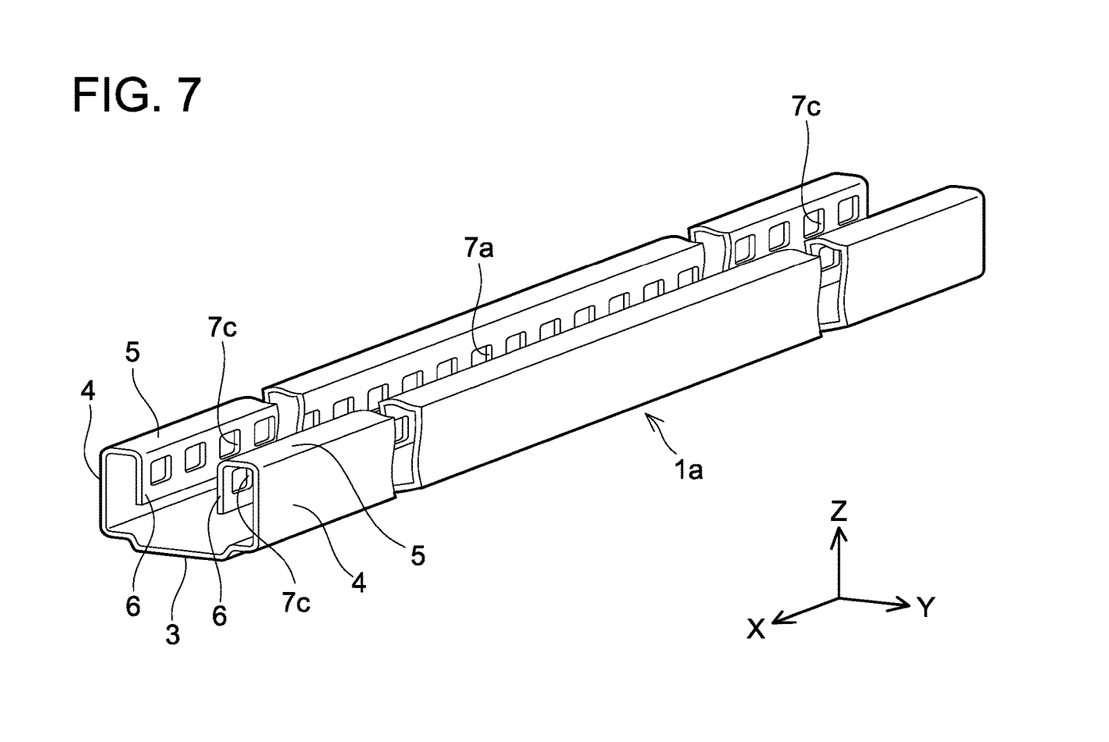
FIG. 7 is a perspective view of a lower rail according to a first variant.
Figure 8:
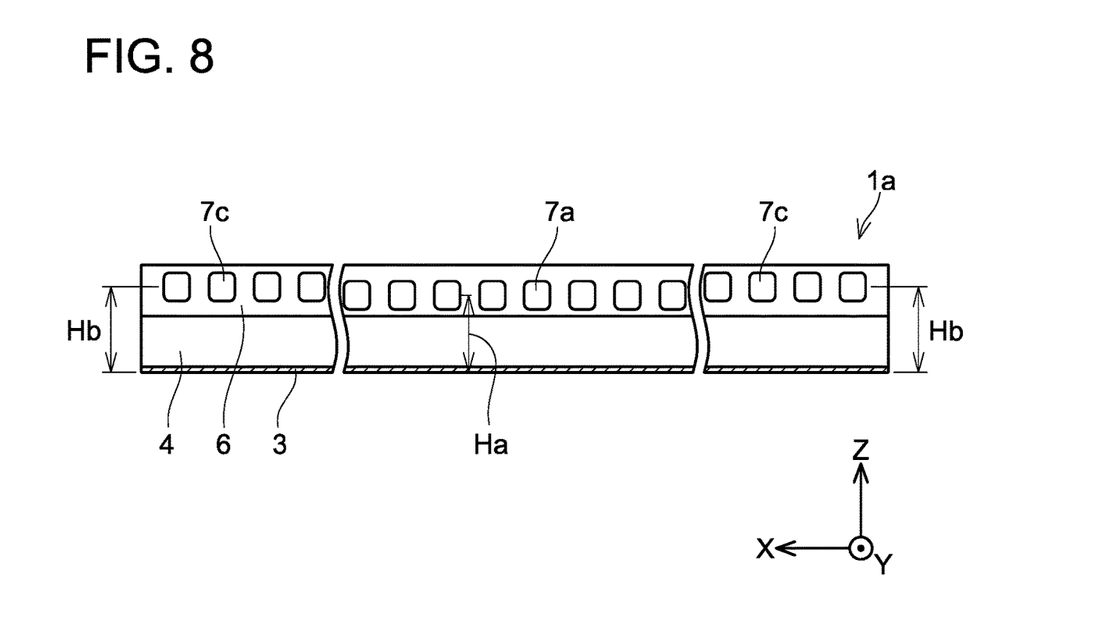
FIG. 8 is a cross-sectional view of the lower rail according to the first variant.

A lower rail 1a according to a first variant will be described with reference to FIGS. 7 and 8. FIG. 7 is a perspective view of the lower rail 1a. FIG. 8 is a cross-sectional view of the lower rail 1a cut along an XZ plane passing through a center thereof in a short direction of the lower rail 1a. The lower rail 1a is similarly provided with a plurality of first holes 7a arranged in a middle portion in a rail longitudinal direction and a plurality of second holes 7c arranged at end portions of the lower rail 1a in the rail longitudinal direction. The first holes 7a and the second holes 7c are provided in each of a pair of inner vertical plate portions 6.

The plurality of first holes 7a is arranged in the rail longitudinal direction at the first pitch Pa which is same as that of the first holes 7a of the lower rail 1 according to the embodiment. The plurality of second holes 7c is also arranged in the rail longitudinal direction at the same first pitch Pa. The plurality of second holes 7c is positioned at a height, that is, a height Hb from a bottom plate portion 3, that differs from a height Ha at which the first holes 7a are positioned. Since the heights are different despite the pitches being the same, the lock pins 14a of the upper rail 2 cannot engage with the second holes 7c. On the other hand, the second holes 7c achieve the effect of reducing springback at the end portions of the lower rail 1a and decreasing a shape difference between the middle portion and the end portions thereof, similar to the second holes 7b according to the embodiment.

Figure 9:
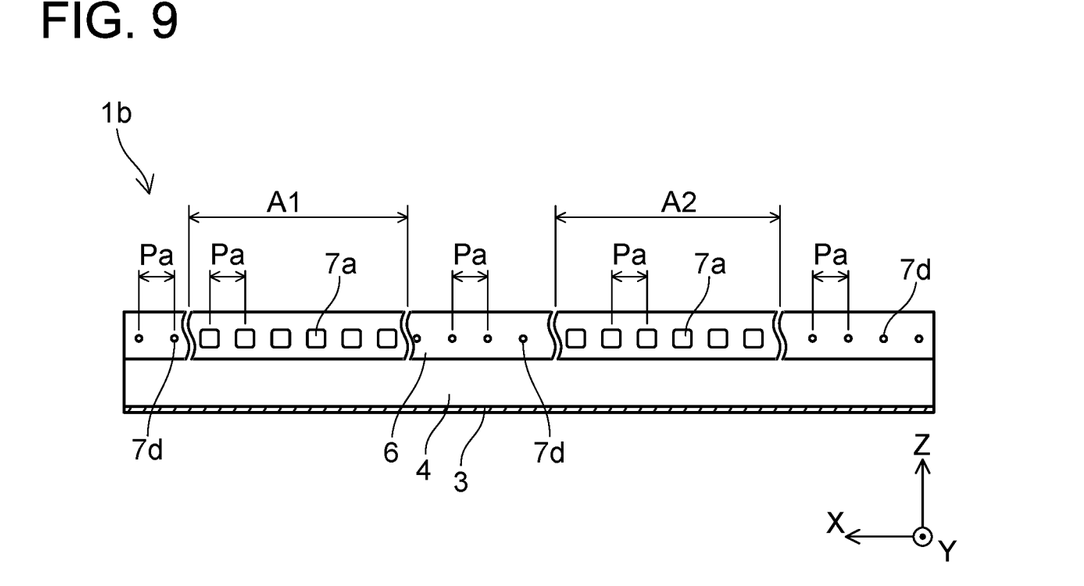
FIG. 9 is a cross-sectional view of a lower rail according to a second variant.

A lower rail 1b according to a second variant will be described with reference to FIG. 9. FIG. 9 is a cross-sectional view of the lower rail 1b according to the second variant. FIG. 9 is the cross-sectional view of the lower rail 1b cut along an XZ plane passing through a center thereof in a short direction of the lower rail 1b, similar to FIG. 8. The lower rail 1b is similarly provided with a bottom plate portion 3 attachable to the body of the vehicle, a pair of outer vertical plate portions 4, a pair of upper plate portions 5 (not shown in FIG. 9), and a pair of inner vertical plate portions 6. Each of the inner vertical plate portions 6 is provided with a plurality of first holes 7a and a plurality of second holes 7d arranged at the first pitch Pa in a rail longitudinal direction. The first holes 7a are arranged in the rail longitudinal direction by being distributed in two areas A1, A2. Two upper rails (that is, two seats) can be attached to the lower rail 1b of FIG. 9 in the rail longitudinal direction. A seat slider device including the lower rail 1b may be used, for example, for fixing a seat in a second row and a seat in a third row in the vehicle.

The second holes 7d are arranged in the rail longitudinal direction of the lower rail 1b in areas other than the areas A1 and A2. The plurality of second holes 7d is arranged at the same first pitch Pa as the first holes 7a, however, a size thereof is much smaller than that of the first holes 7a. Due to this, although the second holes 7d are arranged at the first pitch Pa, the lock pins 14a (see FIG. 3) cannot engage therewith. An area of each second hole 7d simply needs to be smaller than an area of a distal end of its corresponding lock pin 14a.

Figure 10:
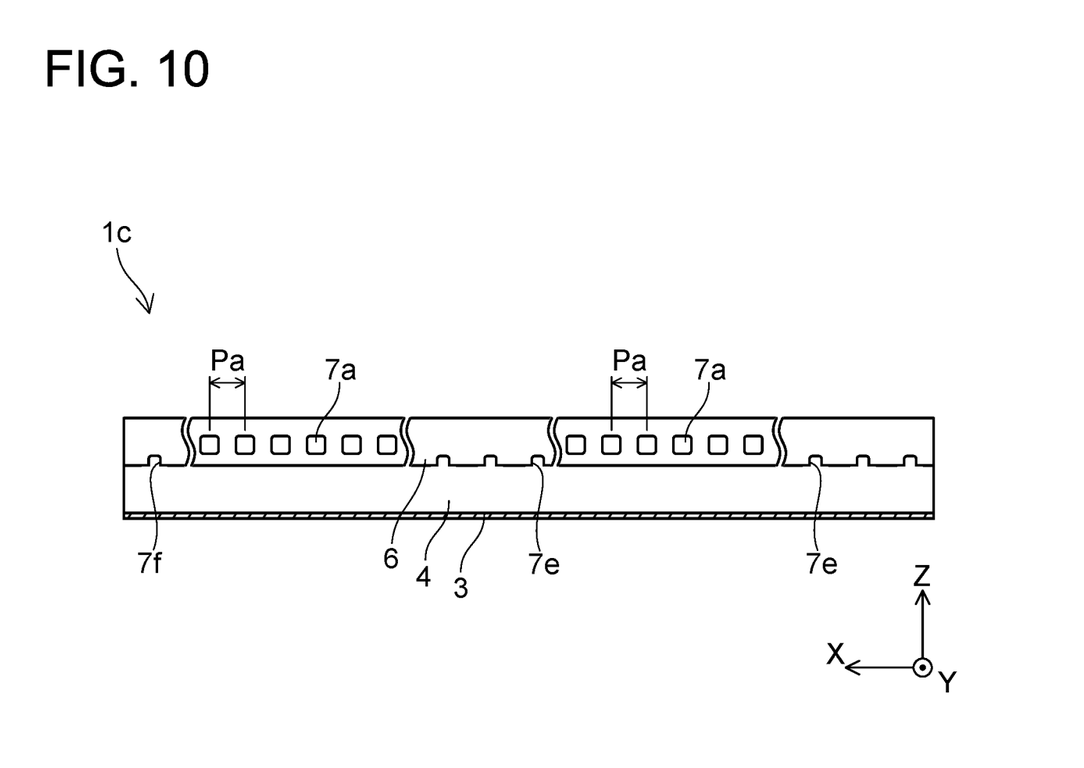
FIG. 10 is a cross-sectional view of a lower rail according to a third variant.

A lower rail 1c according to a third variant will be described with reference to FIG. 10. FIG. 10 is a cross-sectional view of the lower rail 1c according to the third variant. FIG. 10 is also the cross-sectional view cut along an XZ plane passing through a center thereof in a short direction of the lower rail 1c, similar to FIG. 8. The lower rail 1c is similarly provided with a bottom plate portion 3 attachable to the body of the vehicle, a pair of outer vertical plate portions 4, a pair of upper plate portions 5 (not shown in FIG. 10), and a pair of inner vertical plate portions 6. Each of the inner vertical plate portions 6 is provided with a plurality of first holes 7a arranged at the first pitch Pa and a plurality of second holes 7e, 7f in a rail longitudinal direction. The first holes 7a of the lower rail 1c in FIG. 10 are arranged in the rail longitudinal direction by being distributed in two areas, similar to the lower rail 1b in FIG. 9, and two upper rails (that is, two seats) can be attached in the rail longitudinal direction.

The second holes 7e, 7f are arranged in the rail longitudinal direction of the lower rail 1c in areas where the first holes 7a are not arranged. The second holes 7e, 7f are provided at a height different from a height at which the first holes 7a are provided, by which the lock pins 14a (see FIG. 3) cannot engage with the second holes 7e, 7f.

The second holes 7e, 7f have their lower portions cut off. As such, each of the second holes 7e, 7f may have a part thereof cut off. Further, only one second hole 7f is provided at a left end in FIG. 10. As above, only one second hole 7f may solely be provided.

Characteristics of the seat slider device 100 according to the embodiment will be described again below. The seat slider device 100 comprises: the lower rail 1 attachable to the body of the vehicle; and the upper rail 2 attachable to the lower portion of the seat. The upper rail 2 slidably engages with the lower rail 1. The lower rail 1 is fabricated from one piece of metal plate. The lower rail 1 comprises the bottom plate portion 3 attachable to the body of the vehicle, the pair of outer vertical plate portions 4, the pair of upper plate portions 5, and the pair of inner vertical plate portions 6. The pair of outer vertical plate portions 4 extends upward from the respective ends of the bottom plate portion 3 in the rail short direction. The pair of upper plate portions 5 extends laterally from the upper ends of the respective outer vertical plate portions 4 toward the center in the rail short direction. The pair of inner vertical plate portions 6 extends downward from the inner ends of the respective upper plate portions 5. When seen along the rail longitudinal direction, each set of the outer vertical plate portion 4, the upper plate portion 5, and the inner vertical plate portion 6 is connected in an inverted U shape. In the lower rail 1a according to the variant, the height Ha at which the first holes 7a are provided and the height Hb at which the second holes 7c are provided differ from each other. Here, a height at which a hole is provided means a distance from the bottom plate portion 3 to the hole.

The plurality of first holes 7a and the plurality of second holes 7b arranged in a row along the rail longitudinal direction are provided in each of the inner vertical plate portions 6 of the lower rail 1. The plurality of first holes 7a is arranged at the first pitch Pa in the middle portion of each of the inner vertical plate portions 6. The plurality of second holes 7b is arranged at the second pitch Pb in the end portions of each of the inner vertical plate portions 6 in the rail longitudinal direction. The second pitch Pb is different from the first pitch Pa. The first pitch Pa is equal to the pitch of the plurality of lock pins 14a provided in the upper rail 2. Further, the lock pins may be singular instead of being plural in number.

The other technical points regarding the embodiment will be described below. The embodiment describes an example in which the seat slider device is arranged with the rail longitudinal direction matching a front-rear direction of the seat. The seat slider device may be attached to the seat in any orientation. For example, the seat slider device may be attached with the rail longitudinal direction matching a lateral direction of the seat (a widthwise direction of the vehicle). Alternatively, the seat slider device may be attached with the rail longitudinal direction being oblique with respect to the seat.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A method of manufacturing a lower rail of a seat slider device having an upper rail slidably engaging with the lower rail, wherein the upper rail includes lock pins arranged in line along a longitudinal direction of the lower rail, the method comprising:

forming a first group of holes, a second group of holes, and a third group of holes in a plate that has an overall length along the longitudinal direction, wherein
the first group of holes is formed between the second group of holes and the third group of holes,
the first group of holes, the second group of holes and the third group of holes together are distributed along the overall length,
the first group of holes are formed with a size and an interval that allows the lock pins to be engaged with the first group of holes, wherein
the second group of holes and the third group of holes are not aligned with the first group of holes,
the second group of holes and the third group of holes are arranged at different intervals from the interval of the first group of holes, or
the second group of holes and the third group of holes are smaller than tips of the lock pins, such that the lock pins are incapable of engaging with the second group of holes and the third group of holes; and bending the plate to include
a bottom plate section,
a pair of outer vertical plate sections respectively extending upward from both ends of the bottom plate section in a rail short direction,
a pair of upper plate sections respectively extending laterally from upper ends of corresponding outer vertical plates toward a center in the rail short direction, and
a pair of inner vertical plate sections respectively extending downward from inner ends of corresponding upper plates, wherein the first group of holes, the second group of holes and the third group of holes are within at least one of the pair of inner vertical plate sections.

2. The manufacturing method of claim 1, wherein the second group of holes and the third group of holes are not in either of the pair of upper plate sections.

3. The manufacturing method of claim 1, wherein the second group of holes includes more than two holes and the third group of holes includes more than two holes.

* * * * *